US006981081B2

(12) United States Patent
Stevens, Jr. et al.

(10) Patent No.: US 6,981,081 B2
(45) Date of Patent: Dec. 27, 2005

(54) METHOD FOR SMI ARBITRATION TIMELINESS IN A COOPERATIVE SMI/DRIVER USE MECHANISM

(75) Inventors: William A. Stevens, Jr., Folsom, CA (US); Alberto J. Martinez, El Dorado Hills, CA (US); Christopher J. Spiegel, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 10/325,776

(22) Filed: Dec. 19, 2002

(65) Prior Publication Data
US 2004/0123007 A1   Jun. 24, 2004

(51) Int. Cl.[7] ............................................. G06F 13/14
(52) U.S. Cl. ........................ 710/113; 710/44; 710/46; 710/47
(58) Field of Search ........................... 710/44, 46, 47, 710/107, 113, 260

(56) References Cited

U.S. PATENT DOCUMENTS

| | | | | |
|---|---|---|---|---|
| 6,125,450 A | * | 9/2000 | Kardach | 713/323 |
| 2003/0063071 A1 | * | 4/2003 | Wyatt | 345/172 |
| 2003/0188066 A1 | * | 10/2003 | Kwatra et al. | 710/260 |
| 2004/0054834 A1 | * | 3/2004 | Devins et al. | 710/260 |
| 2004/0098527 A1 | * | 5/2004 | Kwatra et al. | 710/260 |

* cited by examiner

Primary Examiner—Glenn A. Auve
(74) Attorney, Agent, or Firm—Pillsbury Winthrop Shaw Pittman LLP (57) ABSTRACT

A Bus Driver implements an arbitration mechanism to allow both the system management interrupt (SMI) and the Bus Driver to cooperatively use a Bus host controller hardware. This mechanism employs a hardware-based semaphore (status bit) to allow either the SMI or the driver to claim ownership of the Bus host controller for an arbitrary period of time. While either the SMI or the driver may own the status bit, the other party must poll the bit until ownership is achieved. For the SMI, this involves scheduling a periodic SMI interrupt. The driver performs self arbitration of claiming the status bit to provide the periodic SMI interrupt the opportunity to claim the bit. The mechanism allows the SMI access to the Bus host controller in a "timely" manner, while minimizing impact to driver access to the Bus host controller, which could impact driver Bus transaction throughput.

16 Claims, 9 Drawing Sheets

METHOD FOR SMI ARBITRATION TIMELINESS IN A COOPERATIVE SMI/DRIVER USE MECHANISM

BACKGROUND OF THE INVENTION

1. Field of the Invention

The present invention relates to computing systems, and more particularly, to semaphoring hardware and a control mechanism thereof.

2. Discussion of the Related Art

A semaphore is a hardware or software flag. In multitasking systems, a semaphore is a variable with a value that indicates the status of a common resource. The semaphore is used to lock the resource that is being used. A process needing the resource checks the semaphore to determine the resource's status and then decides how to proceed.

In programming, for example in UNIX systems, semaphores are a technique for coordinating or synchronizing activities in which multiple processes compete for the same operating system resources. A semaphore is a value in a designated place in operating system (or kernel) storage that each process can check and then change. Depending on the value that is found, the process can use the resource or will find that it is already in use and must wait for some period before trying again. Semaphores can be binary (0 or 1) or can have additional values. Typically, a process using semaphores checks the value and then, if it is using the resource, changes the value to reflect this so that subsequent semaphore users will know to wait.

Semaphores are commonly used for two purposes: to share a common memory space and to share access to files. Semaphores are one of the techniques for interprocess communication (IC). The operating system provides a set of interfaces or "functions" for managing semaphores.

In general, an example of a hardware based semaphore may be described in terms of a status bit of a host status register that allows access to the input/output registers of a host controller of a device. The polling and capture of the status bit by software allows the software access to the input/output registers of the host controller to initiate transactions.

An example of a hardware based semaphore is a status bit, an INUSE_STS bit, utilized in a Host Status Register of a System Management Bus (SMBus) host controller operating in an Intel I/O Controller Hub 4 (ICH4). The INUSE_STS bit is used as a semaphore for various independent software threads that may need to use the ICH4's SMBus logic, and has no effect on hardware. After a full PCI reset, the INUSE_STS bit is equal to a 0, and a read to this bit returns a 0. If the INUSE_STS bit equals a 1, after a first read, subsequent reads will return a 1. A write of a 1 to this bit will reset the next read value to 0. Writing a 0 to this bit has no effect. Software can poll this bit until it reads a 0, and the software will then own the usage of the host controller.

The Intel ICH4 SMBus Driver implements a mechanism to allow both system management interrupt (SMI) and Operating System present software (the Intel ICH4 SMBus Driver) to cooperatively use the SMBus host controller hardware in the Intel ICH4 component. This mechanism employs the hardware-based semaphore INUSE_STS bit to allow either the SMI or the driver to claim ownership of the SMBus host controller for an arbitrary period of time. While either the SMI or the driver own the INUSE_STS semaphore, the other party must poll the INUSE_STS bit until ownership is achieved. For SMI, this involves scheduling a periodic SMI interrupt. The mechanism assumes both the SMI and the driver are cooperative in that they will release the INUSE_STS semaphore when they have completed their transaction. However, this mechanism does not provide timely access to the SMBus host controller by either the SMI or the driver, only eventual access.

Another example of a hardware based semaphore is an INUSE_STS bit utilized in an internal thermal sensor of a Northbridge chip. The Northbridge chip may contain devices, e.g., a memory controller, a graphics controller, or a Accelerated Graphics Port (AGP) bus controller capable of producing enough heat to damage the part. The internal thermal sensor provides a closed loop feedback path, and an emergency indicator. The internal thermal sensor may have two trip points. A trip point may be implemented with a comparator which indicates whether the temperature is above or below its set point.

Multiple entities, e.g., the memory controller, the graphics controller, or the AGP bus controller, have software drivers vying for control of a set of input/output (I/O) registers within the internal thermal sensor. Software drivers have the ability to program the temperature trip points. This may be used to either change the trip point, or to measure the current temperature. The internal thermal sensor may be programmed to cause hardware throttling and/or software interrupts. Hardware throttling includes 3D throttling, main memory throttling, and local memory throttling. Interrupts include System Control Interrupt (SCI), SMI, SERR, or graphics interrupt ( graphics INTR). This mechanism also assumes that the memory controller, the graphics controller, or the AGP bus controller software drivers are cooperative in that they will release the INUSE_STS semaphore when they have completed their transaction. Again, this mechanism does not provide timely access to the internal thermal sensor by either of the software drivers, only eventual access.

What is needed is an algorithm that utilizes the semaphoring capability of a hardware device to allow multiple entities to efficiently arbitrate for control of the hardware device thus allowing timely access to the hardware by an entity.

DETAILED DESCRIPTION

Embodiments of the present invention exists within the context of multiple entities, vying for control of a hardware device, utilizing an arbitration algorithm and the semaphoring nature of the hardware to optimize efficient use of control of the hardware device. Entities may include, for example, two operating system (OS) drivers in a multi-tasking operating system vying for control of an Accelerated Graphics Port (AGP) bus controller, an OS driver and an Integrated Drive Electronics (IDE) micro-controller vying for control of an Universal Serial Bus (USB) controller, a memory controller, graphics controller, or AGP bus controller vying for control of a set of input/output (I/O) registers within a internal thermal sensor, or an OS driver and BIOS code using special Central Processing Unit (CPU) modes ( e.g., IA64's Platform Management Interrupt (PMI), SMI, Ring −1) vying for control of a bus controller.

An embodiment of the present invention illustrates the use of semaphoring hardware and a control mechanism thereof with an example of two entities, an OS present driver and a system management interrupt (SMI), vying for control of hardware, a Bus controller. Specifically, a Bus driver implements an arbitration algorithm to allow both the system management interrupt (SMI) and the Bus driver to cooperatively use a Bus host controller hardware.

This arbitration algorithm employs a hardware-based semaphore (status bit) to allow either the SMI or the driver to claim ownership of the Bus host controller for an arbitrary period of time. While either the SMI or the driver may own the status bit, the other party must poll the bit until ownership is achieved. For the SMI, this involves scheduling a periodic SMI interrupt. The driver performs self arbitration of claiming the status bit to provide the periodic SMI interrupt the opportunity to claim the bit. The mechanism allows the SMI access to the Bus host controller in a "timely" manner, while minimizing impact to driver access to the Bus host controller, which could impact driver Bus transaction throughput.

A brief discussion of relevant computer architecture may be helpful in describing various aspects of embodiments of the present invention. The System Management Mode (SMM) is a standard architectural feature in all IA-32 processors, beginning with the Intel 386™ SL processor. SMM provides an operating system (OS)-transparent alternative operating environment for implementing original equipment manufacture (OEM) platform-specific functions, including late-breaking chipset or device patches, special-case device management, power management, BIOS security and OEM value-added features. SMM is intended for use only by system firmware, not by applications software or general-purpose system software.

The main benefit of SMM is that it offers a distinct and easily isolated processor environment that operates transparently to the operating system or executive and software applications. When SMM is invoked through a system management interrupt (SMI), the processor saves the current state of the processor (the processor's context), then switches to a separate operating environment contained in system management random access memory (SMRAM). While in SMM, the processor executes SMI handler code to perform operations such as powering down unused disk drives or monitors, executing proprietary code, or placing the whole system in a suspended state. When the SMI handler has completed its operations, it executes a resume (RSM) instruction. This instruction causes the processor to reload the saved context of the processor, switch back to protected or real mode, and resume executing the interrupted application or operating-system program or task.

The following SMM mechanisms make it transparent to applications programs and operating systems:

The only way to enter SMM is by means of an SMI.

The processor executes SMM code in a separate address space (SMRAM) that can be made inaccessible from the other operating modes.

Upon entering SMM, the processor saves the context of the interrupted program or task.

All interrupts normally handled by the operating system are disabled upon entry into SMM.

The RSM instruction can be executed only in SMM.

SMM is similar to the real-address mode in that there are no privilege levels or address mapping. An SMM program can address up to 4 GBytes of memory and can execute all I/O and applicable system instructions.

In embodiments of the present invention a processor triggered by an SMI interrupt executes SMI handler code to perform the polling of the hardware-based semaphore (status bit) to allow the SMI to claim ownership of the Bus host controller for an arbitrary period of time.

Modem computing systems contain chipsets. The function of a chipset is to communicate between all components of a personal computer (PC), i.e., the chipset is the infrastructure. The chipset contains numerous components, and moreover, it makes various interfaces available for connecting additional components (Peripheral Component Interconnect (PCI) bus, Universal Serial Bus (USB), Accelerated Graphics Port (AGP) bus, Integrated Drive Electronics (IDE), etc). The chipset may illustratively consist of two units, the Northbridge and the Southbridge.

The Northbridge usually contains the CPU interface and the memory controller. The Northbridge controls the processor, memory, PCI bus, Level 2 cache, and an AGP bus. This chip is larger in size than the Southbridge, because hundreds of data paths are needed for the processor and the RAM. The Southbridge may be, for example, an Intel chipset that manages the basic forms of input/output (I/O) such as a PCI controller, floppy/ IDE/ hard disk controllers, serial and parallel ports, USB support and power management functions.

Figure 1:
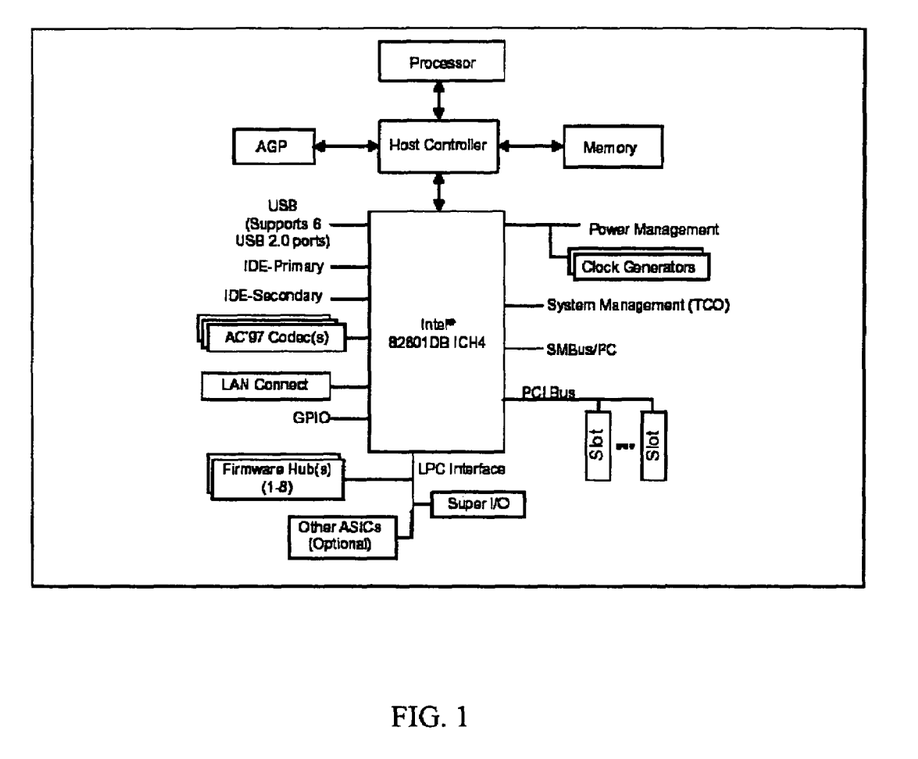
FIG. 1 illustrates a computing system including an Input/Output Controller Hub and a SMBus.

The Intel Hub Architecture (IHA) is an alternative to the Northbridge/Southbridge chipset. The IHA chipset has two parts also, the Graphics and AGP Memory Controller Hub (GMCH) and the I/O Controller Hub (ICH), see FIG. 1. The IHA architecture is used, for example, in Intel's 800 series chipsets.

The Intel 845E and 845G chipsets use the I/O Controller Hub 4 (ICH4). The ICH4 includes access to an SMBus. The SMBus is a two-wire interface through which various system component chips can communicate with each other and with the rest of the system. The SMBus is a low-power, low-cost, communication link between a variety of devices including batteries, power devices and system sensors. It is based on the principles of operation of Inter-IC ($I^2C$). SMBus provides a control bus for system and power management related tasks. A system may use SMBus to pass messages to and from devices instead of tripping individual control lines. Removing the individual control lines reduces pin count. Accepting messages ensures future expandability. With SMBus, a device can provide manufacturer information, tell the system what its model/part number is, save its state for a suspend event, report different types of errors, accept control parameters, and return its status.

One purpose of the SMBus is to define the communication link between an intelligent battery, a charger for the battery and a microcontroller that communicates with the rest of the system. However, SMBus can also be used to connect a wide variety of devices including power-related devices, system sensors, inventory erasable programmable read-only memories (EEPROMs), communications devices and more.

The ICH4 provides a SMBus 2.0-compliant host controller as well as an SMBus Slave Interface. The host controller provides a mechanism for the central processing unit (CPU) to initiate communications with SMBus peripherals (slaves). In addition, ICH4 is also capable of operating in a mode in which it can communicate with $I^2C$ compatible devices. The ICH4 can transmit SMBus messages with packet error checking (PEC) either enabled or disabled. The ICH4s SMBus controller implements hardware-based PEC, i.e., the actual PEC calculation and checking for SMBus messages with PEC enabled is performed in the hardware. The SMBus host Controller logic can be configured to automatically append the cyclic redundancy check (CRC) byte, if configured, and also performs the checking on the CRC. This relieves both the software and CPU for other tasks.

The Slave Interface allows an external master to read from or write to the ICH4. Write cycles can be used to cause certain events or pass messages, and the read cycles can be used to determine the state of various status bits. The ICH4's internal host controller cannot access the ICH4's internal slave interface.

The SMBus host controller is used to send commands to other SMBus slave devices. Software sets up the host controller with an address, command, and, for writes, data and optional PEC; and then tells the controller to start. When the controller has finished transmitting data on writes, or receiving data on reads, it will generate a system management interrupt number (SMI#) or interrupt, if enabled.

The host controller supports eight command protocols of the SMBus interface: Quick Command, Send Byte, Receive Byte, Write Byte/Word, Read Byte/Word, Process Call, Block Read/Write, and host Notify.

The SMBus host controller requires that the various data and command fields be setup for the type of command to be sent. When software sets the START bit, the SMBus host controller performs the requested transaction and interrupts the processor (or generate an SMI#) when the transaction is completed.

Currently, an OS present software (for example, Intel ICH4 SMBus Driver) implements a simple mechanism to allow both system management interrupt (SMI) and the Intel ICH4 SMBus Driver, henceforth referred to as the "SMBus driver" or simply "driver" to cooperatively use the SMBus host controller hardware in the Intel ICH4 component. This mechanism employs a hardware-based semaphore, named the INUSE_STS bit, to allow either the SMI or the driver to claim ownership of the SMBus host controller for an arbitrary period of time.

The INUSE_STS bit is used as a semaphore for various independent software threads that may need to use the ICH4's SMBus logic, and has no effect on hardware. After a full PCI reset, the INUSE_STS bit is equal to a 0, and a read to this bit returns a 0. If the INUSE_STS bit equals a 1, after a first read, subsequent reads will return a 1. A write of a 1 to this bit will reset the next read value to 0. Writing a 0 to this bit has no effect. Software can poll this bit until it reads a 0, and the software will then own the usage of the host controller.

While either the SMI or the driver may own the INUSE_STS semaphore, the other party must poll the INUSE_STS bit until ownership is achieved. For SMI, this involves scheduling a periodic SMI interrupt. The mechanism assumes that both the SMI and the driver are cooperative in that they will release the INUSE_STS semaphore when they have completed their transaction. This mechanism does not provide timely access to the SMBus host controller by either the SMI or the driver, only eventual access. The definition of "timely access" is indeterminate, in that it will depend on the nature of the event needing access to the SMBus. A more robust mechanism is required because certain SMI events will be critical in nature and the SMI will require access to the SMBus host controller in a "timely" manner.

Figure 2:
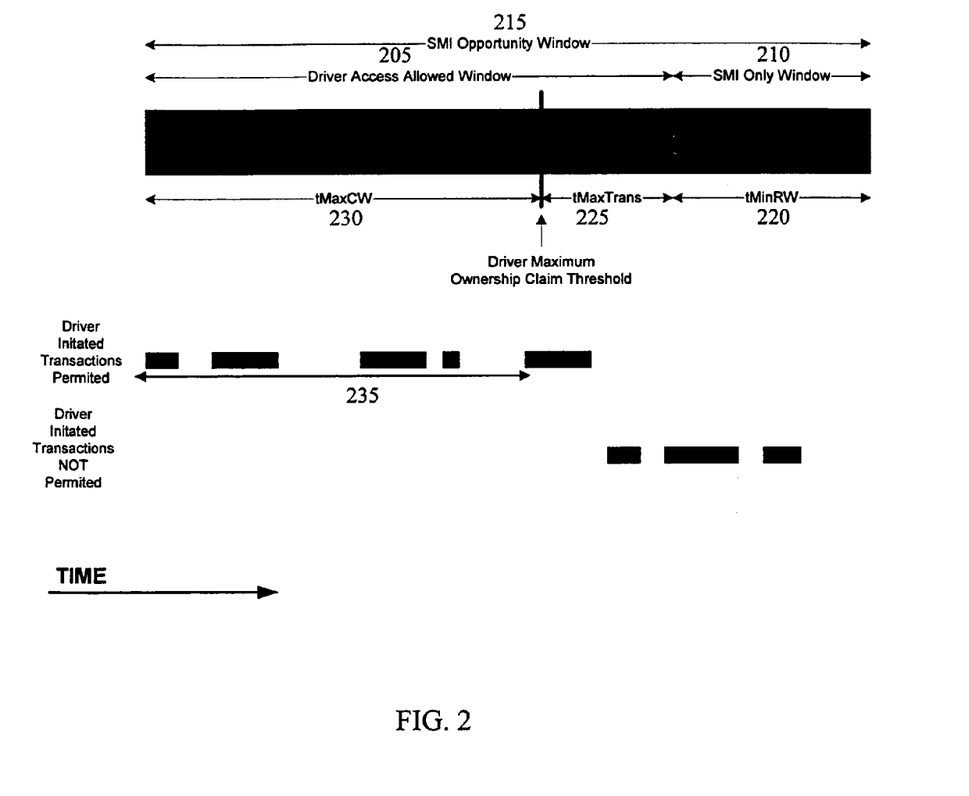
FIG. 2 is a diagram illustrating the relationship of the various operating windows according to an embodiment of the present invention.

An embodiment of the present invention is directed to a arbitration algorithm whereby the driver performs self arbitration of claiming the INUSE_STS bit to provide the periodic SMI interrupt an opportunity to claim the INUSE_STS within a given window of time that starts at a time unknown to the driver. The arbitration algorithm minimizes impact to driver access to the SMBus host controller, which could impact driver SMBus transaction throughput. Referring to FIG. 2, the arbitration algorithm defines two time periods that govern the operation of the driver's self-arbitration: a window of time 205 in which the driver is allowed to access the SMBus and a window of time 210 in which the driver is not allowed to claim the SMBus. Together, these two windows 205, 210 define an opportunity window 215 in which the periodic SMI will be able to intercept the INUSE_STS bit in an unowned state and therefore claim ownership of the SMBus host controller.

This mechanism ensures that the SMI has timely access to the SMBus to service critical events. Without this mechanism, there is no such guarantee and it is possible that system failures due to the SMI/driver sharing mechanisms may result. This mechanism allows SMBus traffic from the operating system to be processed at the normal throughput rate up until the point where the driver must stall to allow the SMI the opportunity to access the SMBus to meet a selected access time criteria.

Referring again to FIG. 2, several windows are defined:
tMinRW 220: The driver's release window, denoted as tMinRW, is the minimum amount of time that the driver must not own the INUSE_STS bit to allow the periodic SMI timer interrupt to occur and claim the INUSE_STS bit.
tMaxCW 230: The driver's claim window, denoted as tMaxCW, is the maximum amount of time in which the driver is allowed to claim the INUSE_STS bit. Note that this is not the maximum amount of time the driver may own the SMBus as a result of claiming the INUSE_STS bit. That amount of time is dependent upon the length of time of SMBus transactions, interrupt latency within the operating system, thread priority and thread switching within the operating system, and cannot be controlled by the driver.
tMaxTrans 225: This is the typical length of the longest transaction supported by the driver. For ICH4, this is a block read transaction that takes 30 ms. Note that an optimization to this algorithm could be to base tMax- Trans time according to the transaction actually being requested, allowing a larger tMaxCW.

The driver must accumulate an amount of elapsed time tAccum 235 within a claim window 230 in which the driver has either claimed the INUSE_STS bit or not claimed the bit without allowing at least one opportunity, a continuous time span tMinRW, to allow the SMI periodic interrupt to claim the SMBus. The amount of accumulated time tAccum 235 equals the time the current or new transaction begins (tTransBegin) minus the time the claim began (tClaimBegin).

This amount of accumulated time tAccum 235 is compared against tMaxCW 230, and if greater (tTransbegin-tClaimBegin>tMaxCW), the SMBus driver must insert a delay of at least tMinRW 220 before attempting to claim the INUSE_STS bit to allow the SMI periodic interrupt an opportunity to claim the SMBus.

Any time the driver observes that it has allowed a continuous time window that exceeded tMinRW 220 without claiming the INUSE_STS bit, it will reset the amount of claimed time tAccum 235 to 0, start a new claim window 230, and begin accumulating time tAccum 235 at the start of the next transaction. This provides for some optimizations to ensure maximum SMBus driver throughput given the constraints of not knowing when (or if) the SMI needs access to the SMBus, yet still ensures SMI access at least once prior to the SMI opportunity window 215 expiring.

If, for instance, the driver has observed that it has allowed a continuous time window that exceeded tMinRW 220 even before reaching an accumulated time tAccum 235 greater than tMaxCW 230, it will reset its tracked amount of claimed time tAccum 235 to 0, starting a new claim window time accumulation tAccum 235. Or, if the driver observes that the SMI has ownership of the INUSE_STS bit, it will also reset its tracked amount of claimed time tAccum 235 to 0, starting a new claim window 230. These optimizations may be better understood by reviewing the examples described below.

Note that in most all cases the driver owns the INUSE_STS bit for very little of the entire tMaxCW 230 time, it only owns the INUSE_STS bit during times in which it performs a transaction. Only if the driver is flooded with many transaction requests is it likely the driver will own the SMBus for the majority of time in the tMaxCW 230 window. As noted in the description of tMaxCW 230, the driver only checks accumulated time tAccum 235 at the beginning of a transaction to determine that it has not exceeded tMaxCW 230. This means that SMI will have opportunity to claim the SMBus within the SMI opportunity window 215 defined as:

$$tSmiOpportunityWindow\ 215 := tMaxCW\ 230 + tMaxTrans\ 225 + tMinRW\ 220$$

For example, the ICH4 periodic SMI call back will occur at 64 ms+/−4 ms, so tMinRW 220 must be >68 ms to ensure the SMI periodic interrupt has opportunity to occur and claim the SMBus. Assuming an ICH4 implementation where the longest transaction (block read) takes 30 ms, and the SMI is to have an opportunity to access the SMBus within tSMIOpportunityWindow=500 ms, the tMaxCW can be determined:

$$tMaxCW\ 230 = tSMIOpportunityWindow\ 215 - tMaxTrans\ 225 - tMinRW\ 220$$

$$tMaxCW\ 230 = 500\ ms - 30\ ms - 69\ ms = 400\ ms$$

Figure 3:
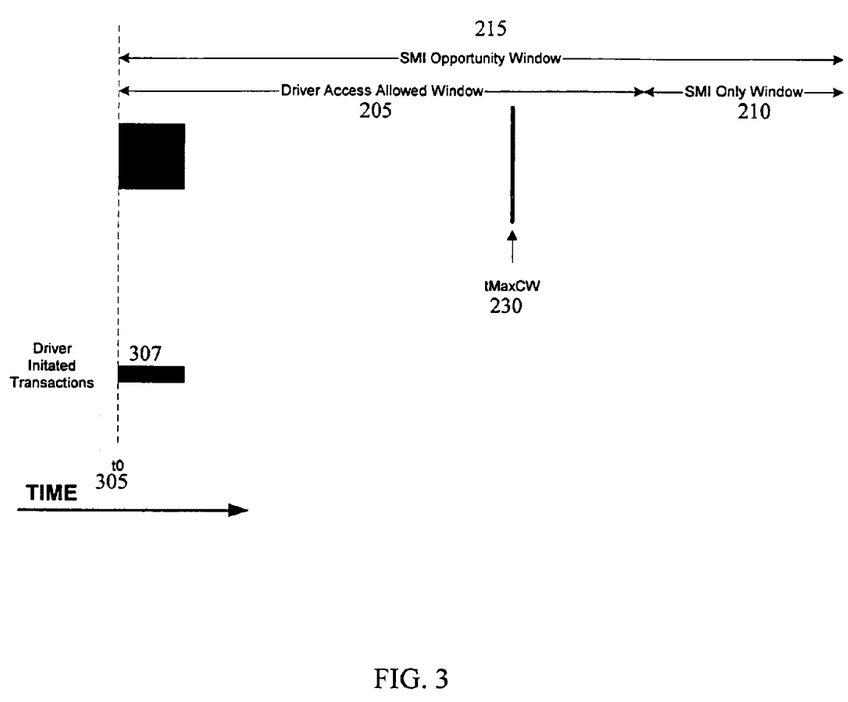
FIG. 3 is a diagram illustrating a sequence of events leading to an early reset of a claim window according to an embodiment of the present invention.
Figure 4:
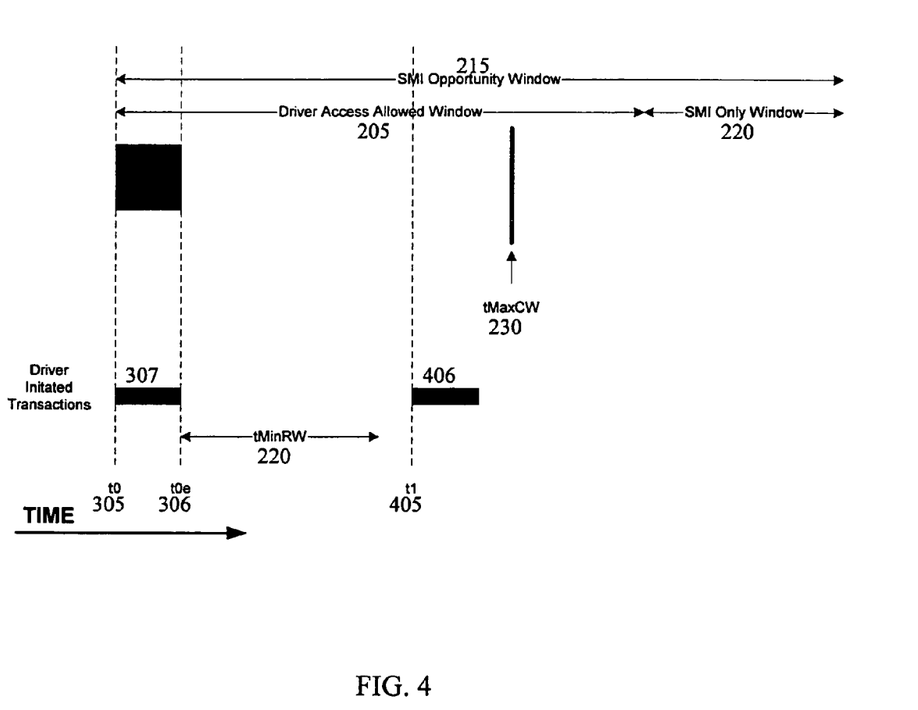
FIG. 4 is a diagram illustrating a sequence of events leading to an early reset of a claim window according to an embodiment of the present invention.
Figure 5:
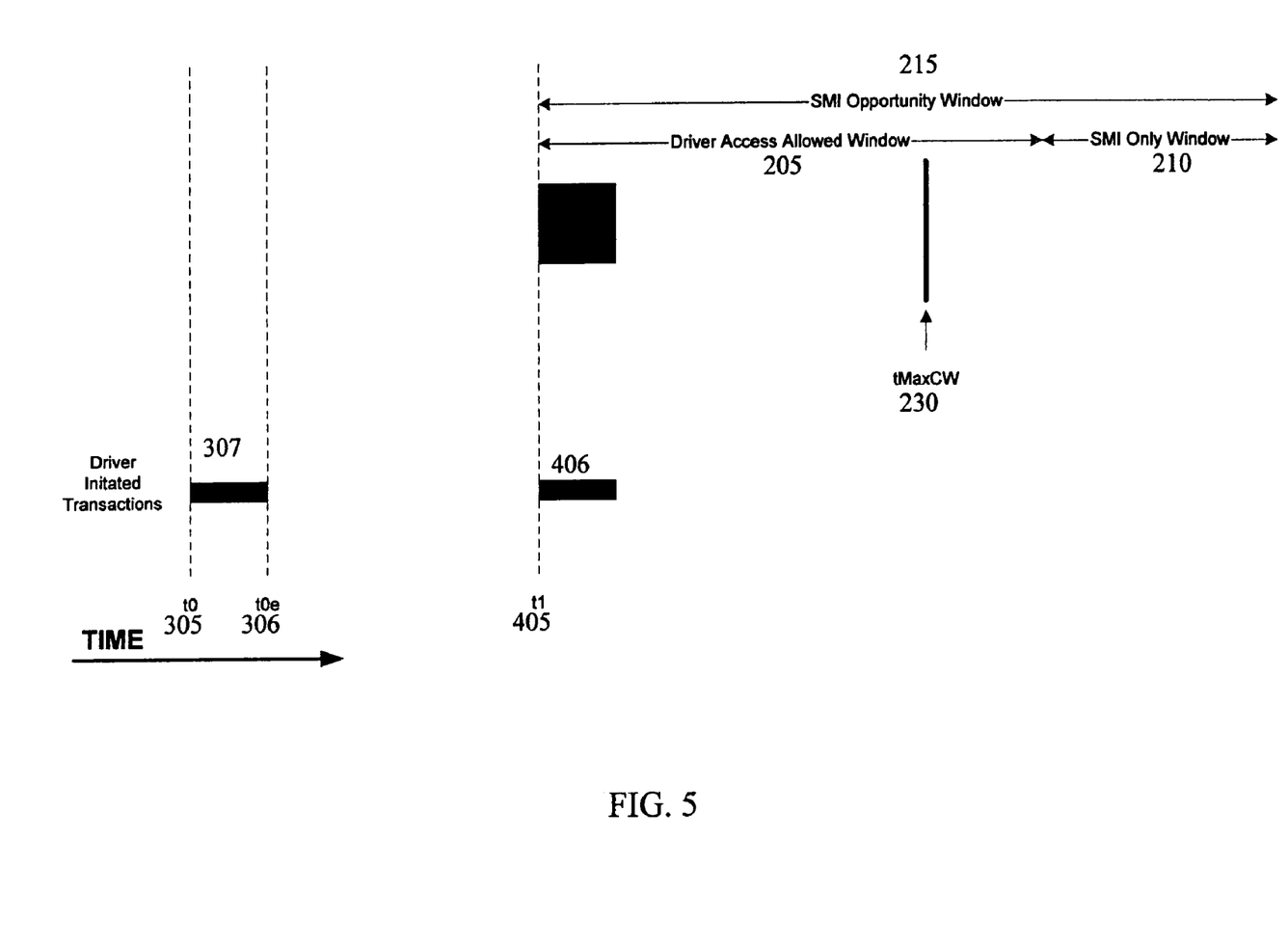
FIG. 5 is a diagram illustrating a sequence of events leading to an early reset of a claim window according to an embodiment of the present invention.

FIG. 3, FIG. 4, and FIG. 5 illustrate an example of an early reset of the claim window 230 according to an embodiment of the present invention. In this example, before reaching an accumulated time tAccum 235 greater than tMaxCW 230, the driver observes the time period tMinRW 220 between transactions, i.e. there is a continuous time period tMinRW 220 in which the driver does not claim the INUSE_STS bit. This indicates that the SMI has had at least one opportunity to claim the INUSE_STS bit during the given SMI opportunity window 215, therefore the driver starts accumulating a new claim window 230 starting with the new transaction. The following sequence of events illustrates the early reset:

1. The driver starts accumulating the claimed time tAccum 235 with transaction 0 307 at the time the transaction begins tTransBegin=t0 305. (see FIG. 3).
2. At time t1 405, the driver receives a new request, and observes that the time between the end of the last transaction tTransEnd (t0e 306) and the start of the new request tTransBegin (t1 405) is greater than tMinRW 220 (tTransBegin−tTransEnd>tMinRW) (see FIG. 4).
3. Therefore, if a SMI had occurred during transaction 0 307, and had to schedule a periodic SMI, the periodic SMI will have had the opportunity to occur and use the SMBus between t0e 306 and t1 405. Therefore, the driver will start a new claim window 230 with transaction 1 406 at t1 405 (see FIG. 5).

Figure 6:
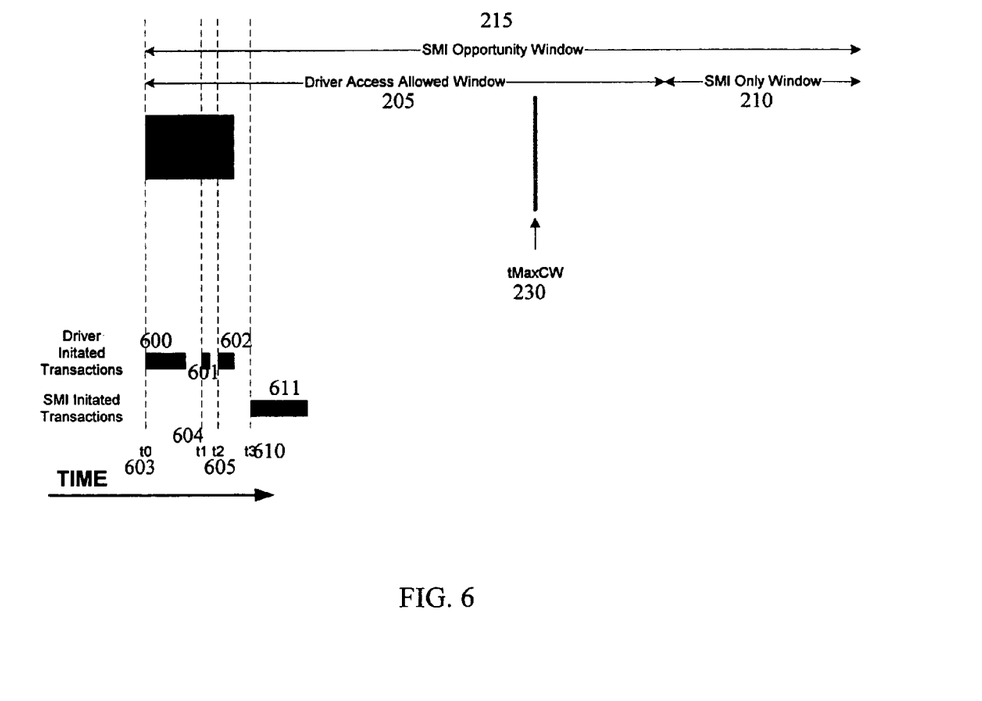
FIG. 6 is a diagram illustrating a sequence of events of a driver observation of SMI ownership resetting a claim window according to an embodiment of the present invention.
Figure 7:
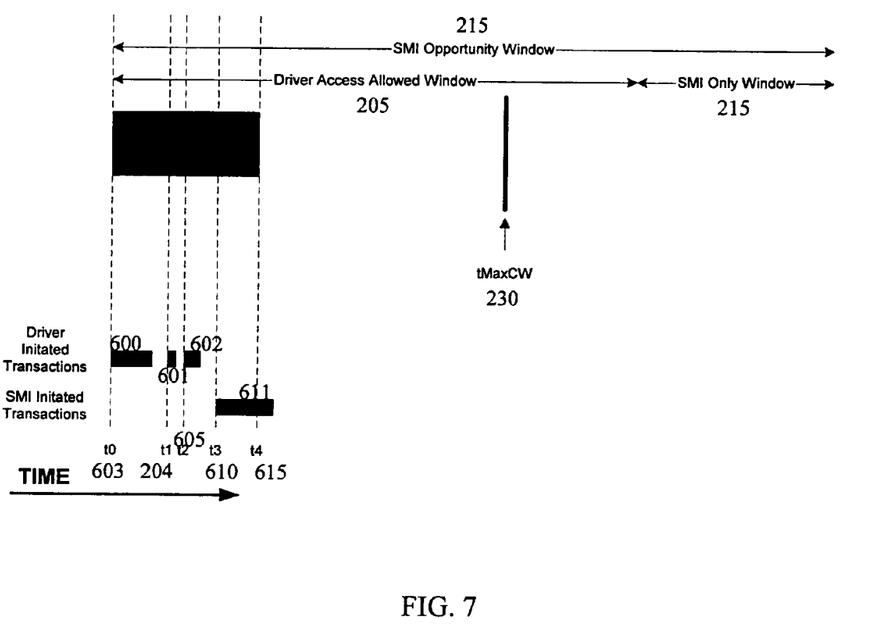
FIG. 7 is a diagram illustrating a sequence of events of a driver observation of SMI ownership resetting a claim window according to an embodiment of the present invention.
Figure 8:
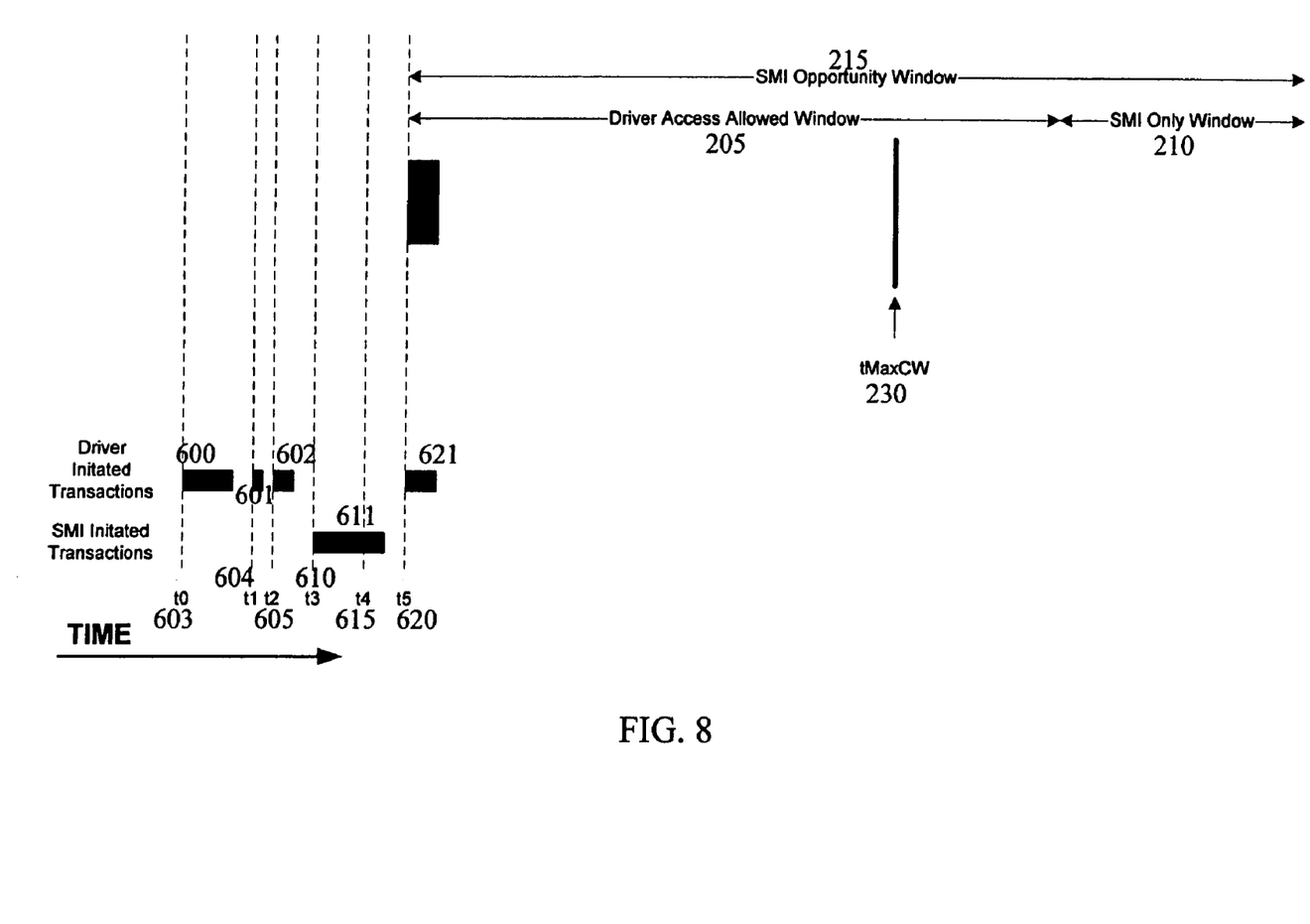
FIG. 8 is a diagram illustrating a sequence of events of a driver observation of SMI ownership resetting a claim window according to an embodiment of the present invention.

FIG. 6, FIG. 7, and FIG. 8 illustrate an example of a driver observation of SMI ownership resetting the claim window 230 according to an embodiment of the present invention. If the driver observes that the SMI handler has ownership of the SMBus by finding the INUSE_STS bit is set, the driver knows the SMI has had opportunity to use the SMBus. Therefore, the driver can reset its claim window 230 and start a new claim window accumulation tAccum 235 with the next transaction. The following sequence of events illustrates the driver observation of SMI ownership resetting the claim window:

1. The driver has already executed several transactions within the claim window (transactions 0 600, 1 601, 2 602 at t0 603, t1 604, & t2 605). At time t3 610, a SMI occurs 611 and starts an SMBus transaction, since the driver currently does not own the SMBus.
2. At time t4 615, the driver receives a new SMBus transaction request. At this time, the driver reads the INUSE_STS bit and finds that it is owned by SMI 611. The driver must now wait for the SMI transaction 611 to complete, and the ownership bit to be cleared by the SMI (see FIG. 7).
3. At time t5 620, the driver again checks the INUSE_STS bit and observes that it can now start the new transaction 621. The driver will also start a new claim window 230 as the driver observed (in step 2) the SMI had used the SMBus prior to time t5 620 (see FIG. 8).

Figure 9:
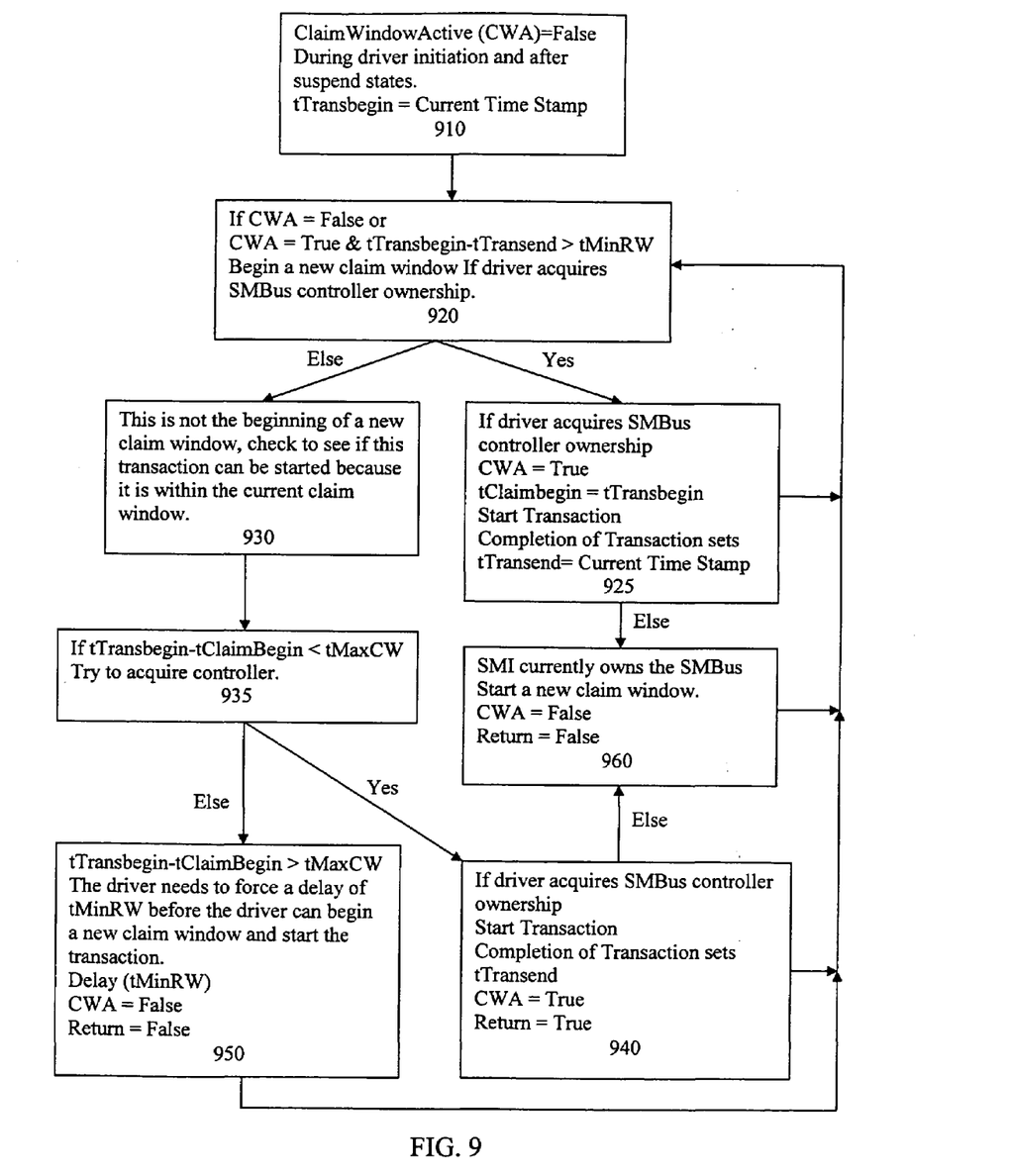
FIG. 9 is a flow chart diagram illustrating a method of driver self-arbitration according to an embodiment of the present invention.

FIG. 9 illustrates flow chart diagram of a method of a driver performing self arbitration of claiming the INUSE_STS bit for controlling an SMBus controller in order to provide the periodic SMI interrupt an opportunity to claim the INUSE_STS bit according to an embodiment of the present invention. Reference may be made to FIG. 2–FIG. 8 throughout the discussion. During driver initiation, and after driver suspend states, a Claim Window Active (CWA) state is set False 910. Start Transaction (ST) is a driver function used to attempt to start a SMBus transaction. If the driver can not start the transaction i.e., because a delay is needed to allow SMI access to the SMBus or an SMI currently owns the SMBus, the ST function will return a false state. The time a transaction begins, tTransBegin, and the time a transaction ends, tTransEnd, may be identified by a Current Time Stamp (CTS) function.

In order to initiate a transaction, the driver first determines whether this is the first transaction requiring a new claim window 230, this is not the first transaction and there is already an existing claim window 230, or there is an existing claim window 230 and the time between the previous transaction ending tTransEnd and the start of the new transaction tTransBegin has exceeded tMinRW 230.

If CWA=False or CWA is true and tTransBegin—tTransEnd is greater than tMinRW, this is the first transaction, or the time between the previous transaction ending tTransEnd and the start of the new transaction tTransBegin has exceeded tMinRW 230, therefore the driver will begin a new claim window 230 if the driver can acquire SMBus controller ownership 920. Otherwise, the driver diverts to operation 930.

To determine if the driver can acquire the SMBus controller ownership, the driver performs the AquireController (AC) function which may consist of polling the INUSE_STS bit. If the INUSE_STS bit equals zero, the driver acquires the SMBus controller ownership 925. CWA is set to a True state, the time the claim begins tClaimbegin is equal to the time the transaction began tTransbegin, the driver starts the transaction function Start Transaction (ST), and at the completion of transaction the driver sets the transaction ending time tTransend equal to the Current Time Stamp (CTS). The driver then returns to operation 920 for the start of the next transaction.

If the INUSE_STS bit equals one, the SMI currently owns the SMBus controller, the driver cannot start the current transaction. However, the SMI has had the opportunity to own the SMBus controller, therefore, the driver can start a new claim window 960. CWA is set to False, Start Transaction (ST) function returns a False because the driver did not start the transaction. The driver returns to operation 920.

If the driver diverted to operation 930, CWA=True or CWA=True and tTransBegin–tTransEnd is less than tMinRW. Therefore, there is an existing claim window 230 and this is not the beginning of a new claim window. The driver must now check to see if this transaction can be started because it is within the current claim window 930. The amount of accumulated time tAccum 235 (tTransbegin-tClaimBegin) is compared against tMaxCW 230.

If the start of the new transaction tTransBegin minus the time the current claim began tClaimBegin is less than tMaxCW, the driver may try to acquire SMBus controller 935. Otherwise, the driver diverts to operation 950.

To determine if the driver can acquire the SMBus controller ownership, the driver performs the AquireController (AC) function which may consist of polling the INUSE_STS bit. If the INUSE_STS bit equals zero, the driver acquires the SMBus controller ownership 940. CWA is set to a True state, the driver starts the transaction function Start Transaction (ST), Start Transaction (ST) function returns a True because the driver did start the transaction, and at the completion of transaction, the driver sets tTransend equal to the Current Time Stamp (CTS). The driver then returns to operation 920 for the start of the next transaction.

If the INUSE_STS bit equals one, the SMI currently owns the SMBus controller, the driver cannot start the current transaction. However, the SMI has had the opportunity to own the SMBus controller. Therefore, the driver can start a new claim. window 960. CWA is set to False, and the Start Transaction (ST) function returns a False because the driver did not start the transaction. The driver returns to operation 920.

If the driver diverted to operation 950, tTransbegin-tClaimBegin>tMaxCW. Therefore, the driver needs to force a delay of tMinRW 220 before the driver can begin a new claim window 230 and start the transaction. The driver stalls 950 for a delay equal to tMinRW 220 to allow the SMI the opportunity to gain control of the SMBus host controller. After the delay period the SMI has had the opportunity to own the SMBus controller, therefore, the driver can start a new claim window 950. CWA is set to False, and the Start Transaction (ST) function returns a False because the driver did not start the transaction. The driver returns to operation 920.

A second embodiment of the present invention includes the use of semaphoring hardware and a control mechanism thereof for multiple entities, a memory controller, a graphics controller, or a AGP bus controller vying for control of a set of input/output (I/O) registers within a internal thermal sensor.

The hardware based semaphore is an INUSE_STS bit utilized in an internal thermal sensor of a Northbridge chip. As discussed above, the Northbridge chip may contain devices, e.g., a memory controller, a graphics controller, or a Accelerated Graphics Port (AGP) bus controller capable of producing enough heat to damage the part. The internal thermal sensor provides a closed loop feedback path, and an emergency indicator. The internal thermal sensor may have two trip points. A trip point may be implemented with a comparator which indicates whether the temperature is above or below its set point.

The multiple entities, e.g., the memory controller, the graphics controller, or the AGP bus controller, have software drivers vying for control of a set of input/output (I/O) registers within the internal thermal sensor. Software drivers have the ability to program the temperature trip points. This may be used to either change the trip point, or to measure the current temperature. The internal thermal sensor may be programmed to cause hardware throttling and/or software interrupts. Hardware throttling includes 3D throttling, main memory throttling, and local memory throttling. Interrupts include SCI, SMI, SERR, or graphics INTR.

The arbitration algorithm discussed in detail above for the SMBus driver is also applicable for use by the memory controller driver, the graphics controller driver, or the AGP bus controller driver for cooperative use, i.e., the drivers will arbitrate and release the INUSE_STS semaphore when they have completed their transaction or provide timely access to the internal thermal sensor for either of the other software drivers.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of controlling a device, comprising:
   polling a status bit, wherein polling the status bit includes
      a first entity and a second entity determining a binary value of the status bit, the binary value determining control of a device controller;

acquiring control of the device controller;

monitoring a length of a control time; and releasing or abstaining from control of the device controller.

2. The method according to claim 1, wherein acquiring control of the device controller includes the first entity or the second entity writing a binary value to the status bit to gain control.

3. The method according to claim 2, wherein monitoring the length of the control time includes the first entity determining a first length of the control time in which the second entity has not had control of the device controller within a claim window, the first entity releasing control or not acquiring control of the device controller, delaying a resetting of the claim window and the start of a next transaction for a period of a second predetermined value, when the first length of the control time exceeds a first predetermined value, and the first entity determining if the device controller has not been under the control of the first entity for a second length of the control time exceeding the second predetermined value, the first entity resetting the claim window for the next transaction.

4. The method according to claim 3, wherein releasing control of the device controller includes the first entity or the second entity writing a binary value to the status bit to release control.

5. A computer-readable medium having encoded thereon a computer-readable program code which when executed causes a computer to:

poll a status bit, wherein polling the status bit includes a first entity and a second entity determining a binary value of the status bit, the binary value determining control of a device controllers;

acquire control of the device controller;

monitor a length of a control time; and release or abstain from control of the device controller.

6. The computer-readable medium according to claim 5, wherein acquiring control of the device controller includes the first entity or the second entity writing a binary value to the status bit to gain control.

7. The computer-readable medium according to claim 6, wherein monitoring the length of the control time includes the first entity determining a first length of the control time in which the second entity has not had control of the device controller within a claim window, the first entity releasing control or not acquiring control of the device controller, delaying a resetting of the claim window and the start of a next transaction for a period of a second predetermined value, when the first length of the control time exceeds a first predetermined value, and the first entity determining if the device controller has not been under the control of the first entity for a second length of the control time exceeding the second predetermined value, the first entity resetting the claim window for the next transaction.

8. The computer-readable medium according to claim 7, wherein releasing control of the device controller includes the first entity or the second entity writing a binary value to the status bit to release control.

9. A method of controlling a bus, comprising:

polling a status bit, wherein polling the status bit includes a software driver and a system management interrupt (SMI) determining a binary value of the status bit, the binary value determining control of a bus controller;

acquiring control of the bus controller;

monitoring a length of a control time; and releasing or abstaining from control of the bus controller.

10. The method according to claim 9, wherein acquiring control of the bus controller includes the software driver or the system management interrupt (SMI) writing a binary value to the status bit to gain control.

11. The method according to claim 10, wherein monitoring the length of the control time includes the software driver determining a first length of the control time in which the SMI has not had control of the bus controller within a claim window, the software driver releasing control or not acquiring control of the bus controller, delaying the resetting of a claim window and the start of a next transaction for a period of a second predetermined value, when the first length of the control time exceeds a first predetermined value, and the software driver determining if the bus controller has not been under the control of the driver for a second length of the control time exceeding the second predetermined value, the software driver resetting the claim window for the next transaction.

12. The method according to claim 11, wherein releasing control of the bus controller includes the software driver or the system management interrupt (SMI) writing a binary value to the status bit to release control.

13. A computer-readable medium having encoded thereon a computer-readable program code which when executed causes a computer to:

poll a status bit, wherein polling the status bit includes a software driver and a system management interrupt (SMI) determining a binary value of the status bit, the binary value determining control of a bus controller;

acquire control of the bus controller;

monitor a length of a control time; and release or abstain from control of the bus.

14. The computer-readable medium according to claim 13, wherein acquiring control of the bus controller includes the software driver or the system management interrupt (SMI) writing a binary value to the status bit to gain control.

15. The computer-readable medium according to claim 14, wherein monitoring the length of the control time includes the software driver determining a first length of the control time in which the SMI has not had control of the bus controller within a claim window, the software driver releasing control or not acquiring control of the bus controller, delaying a resetting of the claim window and the start of a next transaction for a period of a second predetermined value, when the first length of the control time exceeds a first predetermined value, and the software driver determining if the bus controller has not been under the control of the driver for a second length of the control time exceeding the second predetermined value, the software driver resetting the claim window for the next transaction.

16. The computer-readable medium according to claim 15, wherein releasing control of the bus controller includes the software driver or the system management interrupt (SMI) writing a binary value to the status bit to release control.

* * * * *